April 8, 1924.

F. O. BRUNDAGE

ANTISKID CHAIN TIGHTENER

Filed March 14, 1922

1,489,736

Inventor
F. O. Brundage
By Philip A. H. Ferrell
Attorney

Patented Apr. 8, 1924.

1,489,736

UNITED STATES PATENT OFFICE.

FLOYD OSCAR BRUNDAGE, OF TROY, NEW YORK.

ANTISKID-CHAIN TIGHTENER.

Application filed March 14, 1922. Serial No. 543,625.

*To all whom it may concern:*

Be it known that FLOYD OSCAR BRUNDAGE, citizen of the United States, residing at Troy, in the county of Rensselaer and State of New York, has invented certain new and useful Improvements in Antiskid-Chain Tighteners, of which the following is a specification, reference being had therein to the accompanying drawings.

The invention relates to tighteners for antiskid chains used in connection with automobile wheels, and has for its object to provide a device of this character formed from a coiled spring adapted to engage over the felly of a wheel and having its ends bent downwardly and hooked to the antiskid chain, thereby maintaining the same tightly in engagement with the tire.

A further object is to provide link connections between the end convolutions of the spring and extending through the convolutions of the spring for preventing and limiting the stretching of the spring.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 2:
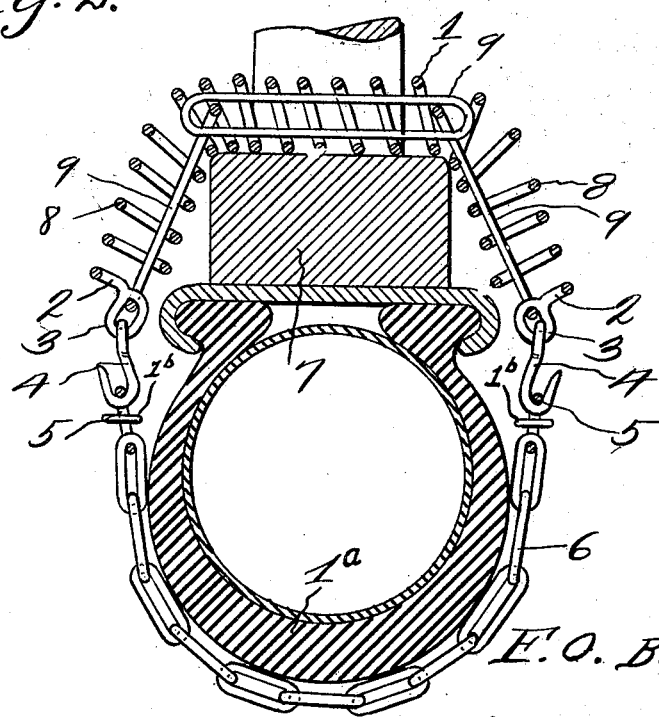
Figure 2 is a transverse sectional view through a wheel felly and tire, showing the chain tightener applied to an antiskid chain carried thereby.

Referring to the drawing, the numeral 1 designates an elongated coiled spring, the end convolutions 2 of which terminate in eyes 3, which eyes are provided with hooks 4 adapted to receive one of the links 5 of the longitudinal chains of a conventional form of antiskid chain, which antiskid chain is provided with transverse chains 6 which extend around the tire 1ª and have their ends connected to the longitudinal chains 1ᵇ. When the device is in position for use as shown in Figure 2 the spring is stretched after one of the hooks 4 has been hooked into one of the links 5, and then bent over the felly 7 and the other end of the spring bent downwardly until the hook 4 at that end is in position to be received by the adjacent link 5. After the device has been bent as above set forth and released, the contraction of the spring and its downwardly extending portions 8 will take up the slack in the antiskid chain and prevent the same from making noise, slipping or bruising the tire, and also preventing the chain from making noise by contact with the mud guard as the wheel revolves.

Figure 1:
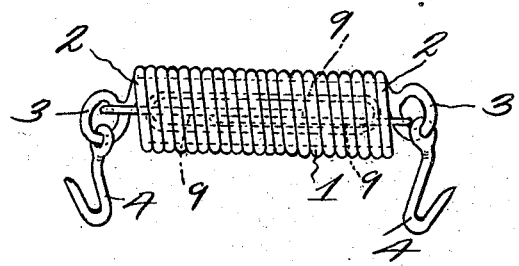
Figure 1 is a side elevation of the chain tightener showing the same contracted and the limiting loops housed in convolutions thereof.

To prevent the spring 1, particularly the downwardly extending portions 8, from being stretched too far, for instance by centrifugal force during the rotation of the wheel, a plurality of connected links 9 are provided, which links are entirely housed within the coiled spring 1 when the device is in contracted position as shown in Figure 1 or in extended position as shown in Figure 2. The outer ends of the outer links 9 extend through the eyes 3, therefore it will be seen that a rigid holding of the chain 6 is provided in case of excessive stretching of the coiled spring 1. It will be seen that when the device is in contracted condition as shown in Figure 1 that the links 9 are entirely housed within the convolutions of the device, thereby allowing the device to be easily packed in a minimum amount of space for shipping and storage purposes. The links also form means for preventing excessive stretching of the coiled spring 1 by forcing the device around large size tires and fellies, such for instance as carried by truck wheels, for which the device may be used. It is obvious that for large size wheels heavier coiled springs 1 would be required.

From the above it will be seen that an antiskid chain tightener is provided, which is simple in construction, the parts reduced to a minimum and the device so constructed that it may be easily and quickly applied to wheels of varying widths, and that the device is positive in its operation. The device may be used for holding the end of a tire chain when the chain is being placed on the wheel and it is desired to revolve the same and roll the wheel onto the end of the chain before connecting the adjacent ends of the chain.

The invention having been set forth what is claimed as new and useful is:—

1. The combination with a wheel felly, a tire carried by said felly, an antiskid chain carried by said tire, of a tightening device for said chain, said device comprising a coiled spring engaging the inner side of the felly, the ends of the coiled spring being flexed outwardly to positions adjacent the sides of the felly, the ends of the spring being detachably connected to the anti-skid chain.

2. The combination with a wheel felly, a tire carried by said felly, an antiskid chain carried by said tire, of a tightening device for said chain, said device comprising a coiled spring arching the felly and having its ends flexed and extending outwardly and attached to the antiskid chain adjacent the sides of the tire.

3. The combination with a wheel felly, a tire carried by said felly, an antiskid chain carried by said tire, of a tightening device for said chain, said device comprising a coiled spring arching the felly and having its ends flexed and extending outwardly and attached to the antiskid chain adjacent the sides of the tire, and means for limiting the stretching of the outwardly flexed ends of the coiled spring.

4. The combination with a wheel felly, a tire carried by said felly, an antiskid chain carried by said tire, of a tightening device for said chain, said tightening device comprising a coiled spring engaging the inner side of the felly, the ends of said coiled spring being flexed outwardly and attached to the antiskid chain adjacent the sides of the tire, a linked member connecting the ends of the coiled spring together and disposed within the convolutions of the coiled spring, said linked member comprising an elongated link having its ends extending beyond the sides of the felly, links loosely connected to the ends of said last named link, and to the ends of the coiled spring, said loose connections of the links forming means whereby a limited amount of play is provided for the antiskid chain under the influence of the flexed ends of the coiled spring.

In testimony whereof I hereunto affix my signature.

FLOYD OSCAR BRUNDAGE.